(12) United States Patent
Fujii et al.

(10) Patent No.: US 9,783,704 B2
(45) Date of Patent: Oct. 10, 2017

(54) DOUBLE-SIDED ADHESIVE TAPE

(75) Inventors: Takahiro Fujii, Osaka (JP); Yoshiaki Mitsuoka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/003,746

(22) PCT Filed: Feb. 20, 2012

(86) PCT No.: PCT/JP2012/053989
§ 371 (c)(1),
(2), (4) Date: Sep. 6, 2013

(87) PCT Pub. No.: WO2012/120997
PCT Pub. Date: Sep. 13, 2012

(65) Prior Publication Data
US 2013/0344323 A1   Dec. 26, 2013

(30) Foreign Application Priority Data

Mar. 9, 2011 (JP) .................................. 2011-051064
Feb. 14, 2012 (JP) .................................. 2012-029146

(51) Int. Cl.
*C09J 7/02* (2006.01)
*C09J 163/00* (2006.01)
(Continued)

(52) U.S. Cl.
CPC ............. *C09J 7/021* (2013.01); *C09J 7/0203* (2013.01); *C09J 163/00* (2013.01);
(Continued)

(58) Field of Classification Search
CPC ..... C09J 163/00; C09J 2463/00; C08G 59/40; C08G 59/14
See application file for complete search history.

(56) References Cited

U.S. PATENT DOCUMENTS 3,326,741 A * 6/1967 Olson ........................... 428/335
3,707,583 A * 12/1972 McKown ........... C08G 59/4014
156/330

(Continued)

FOREIGN PATENT DOCUMENTS

CN   1551315 A   12/2004
CN   101240154 A   8/2008
(Continued)

OTHER PUBLICATIONS

Extended European Search Report issued by EPO on Jul. 22, 2104 in connection with European Patent Application No. 12754950.9.
(Continued)

*Primary Examiner* — Scott R Walshon
(74) *Attorney, Agent, or Firm* — Edwards Neils LLC; Jean C. Edwards, Esq.

(57) ABSTRACT

A double-sided adhesive tape includes a substrate, and a thermosetting resin layer laminated on both sides of the substrate. The thermosetting resin layer contains a rubber-modified epoxy resin and a latent curing agent. The thermosetting resin layer has a flowtester viscosity at 40° C. and under a load of 20 Kg of 1000 Pa·s or more and 7000 Pa·s or less.

5 Claims, 1 Drawing Sheet

(51) Int. Cl.
*C08K 5/00* (2006.01)
*C08K 5/21* (2006.01)

(52) U.S. Cl.
CPC .............. *C08K 5/0025* (2013.01); *C08K 5/21* (2013.01); *C09J 2201/128* (2013.01); *C09J 2205/102* (2013.01); *C09J 2463/00* (2013.01); *Y10T 428/266* (2015.01); *Y10T 428/2848* (2015.01)

(56) References Cited

U.S. PATENT DOCUMENTS

| | | | | |
|---|---|---|---|---|
| 3,894,113 | A | * | 7/1975 | Pagel ............................ 428/107 |
| 3,947,522 | A | * | 3/1976 | Shelley, Jr. ............. C08L 63/00 525/107 |
| 4,374,890 | A | * | 2/1983 | Shimizu .................. B32B 27/38 427/207.1 |
| 4,659,779 | A | * | 4/1987 | Bagga et al. .................... 525/118 |
| 4,751,129 | A | * | 6/1988 | Ramalingam .......... C08G 59/02 427/386 |
| 4,908,273 | A | | 3/1990 | Urech et al. |
| 5,030,698 | A | * | 7/1991 | Mulhaupt .......... C08G 59/4246 525/423 |
| 5,248,559 | A | | 9/1993 | Okui et al. |
| 5,760,135 | A | * | 6/1998 | Korpman ............... C09J 153/02 525/95 |
| 6,265,782 | B1 | | 7/2001 | Yamamoto et al. |
| 6,277,481 | B1 | * | 8/2001 | Sugino et al. ............. 428/317.1 |
| 6,998,011 | B2 | * | 2/2006 | Schoenfeld .......... C08G 18/672 156/331.1 |
| 2001/0022404 | A1 | | 9/2001 | Yamamoto et al. |
| 2005/0070634 | A1 | * | 3/2005 | Lutz et al. .................... 523/427 |
| 2011/0020652 | A1 | * | 1/2011 | Frick ...................... C08G 59/18 428/414 |
| 2011/0045234 | A1 | | 2/2011 | Miyamoto et al. |
| 2013/0149531 | A1 | * | 6/2013 | Kosal ........................ B32B 7/12 428/354 |

FOREIGN PATENT DOCUMENTS

| | | |
|---|---|---|
| CN | 101845287 A | 9/2010 |
| EP | 2522704 | 11/2012 |
| JP | S61-109880 | 5/1986 |
| JP | 62-109880 A | 5/1987 |
| JP | S62-236879 | 10/1987 |
| JP | 63-191880 A | 8/1988 |
| JP | 63-227686 A | 9/1988 |
| JP | S63-309575 A | 12/1988 |
| JP | 02-252779 A | 10/1990 |
| JP | H02-296879 A | 12/1990 |
| JP | 04-106181 A | 4/1992 |
| JP | H04-142382 A | 5/1992 |
| JP | 07-157535 A | 6/1995 |
| JP | 08-020629 A | 1/1996 |
| JP | 2007-246648 A | 9/2007 |
| JP | 2008-531817 A | 8/2008 |
| JP | 2008-542484 A | 11/2008 |
| JP | 2010-250020 A | 11/2010 |
| JP | 2011-38369 A | 2/2011 |
| JP | 2011-236324 A | 11/2011 |
| WO | 2006/093949 A1 | 9/2006 |
| WO | 2006/128722 A1 | 12/2006 |
| WO | WO-2011-083835 | 7/2011 |

OTHER PUBLICATIONS

International Search Report Issued in PCT/JP2012/053989 on Apr. 24, 2012.
First Office Action issued by SIPO on May 15, 2014 in connection with corresponding Chinese Patent Application No. 201280009631.9.
Editoral Board of Dictionary of Chemistry and Chemical Technology; definition of "amide"; Dictionary of Chemistry and Chemical Technology; Jan. 31, 2003; p. 2454.
Hong et al.; Study on Curing Reaction of Medium-Temperature Cured 3221 Epoxy Resin System; Poymer Materials Science and Engineering; Sep. 2006; pp. 58-61; vol. 22, No. 5.
Office Action issued by the SIPO on Dec. 3, 2014 in connection with Chinese Patent Application No. 201280009631.9.
Reasons for Refusal issued by the Japanese Patent Office on Nov. 17, 2015 in connection with Japanese Patent Application No. 2012-029146.
Office Action issued by the State Intellectual Property Office of the People's Republic of China on Nov. 4, 2016, in connection with Chinese Patent Application No. 201510427538.5.
Office Action issued by the State Intellectual Property Office of the People's Republic of China dated Jun. 27, 2017, in connection with Chinese Patent Application No. 201510427538.5.

* cited by examiner

DOUBLE-SIDED ADHESIVE TAPE

CROSS-REFERENCE TO RELATED APPLICATIONS

The present invention is a 35 U.S.C. 371 National Stage Entry of PCT/JP2012/053989, filed Feb. 20, 2012, which claims priority from Japanese Patent Application Nos. 2011-051064, filed on Mar. 9, 2011 and 2012-029146, filed on Feb. 14, 2012, the contents of all of which are herein incorporated by reference in their entirety.

TECHNICAL FIELD

The present invention relates to a double-sided adhesive tape, in particular, to a double-sided adhesive tape used for bonding of structural members of various industrial products.

BACKGROUND ART

Conventionally, double-sided adhesive tapes have been widely used for bonding of structural members of various industrial products, due to its more excellent handleability and adhesiveness than those of liquid adhesives.

Patent Document 1 proposes, as an example of such a double-sided adhesive tape, a film adhesive in which an epoxy resin composition is laminated on the surface of nylon nonwoven fabric: the epoxy resin composition includes an epoxy resin, a urea-type epoxy resin curing agent, and a latent curing catalyst; and the epoxy resin contains an epoxy resin containing a rubber component, a solid epoxy resin, and a thermoplastic resin.

In double-sided adhesive tapes, release papers are provided on both sides thereof. The release paper on one side is peeled and the tape is attached onto an adherend surface. Then, thereafter, the release paper on the other side of the attached side is peeled, and a structural member is bonded thereto.

CITATION LIST

Patent Document

Patent Document 1
Japanese Unexamined Patent Publication No. H7-157535

SUMMARY OF THE INVENTION

Problem to be Solved by the Invention

However, in production processes of various industrial products, for example, automobiles, usually, oil is present on the surface of an adherend such as a metal panel.

In such a case, when the film adhesive described in Patent Document 1 is attached onto the surface of the adherend, sufficient adhesiveness may not be ensured.

Thus, in the film adhesive described in Patent Document 1, for example, when, for example, oil is present on the adherend surface, to ensure adhesiveness, cleaning and surface treatment of the adherend surface may become necessary before attachment, which makes the working complicated.

Meanwhile, releasing of the release paper laminated on the film adhesive may sometimes be difficult.

Thus, the present invention provides a double-sided adhesive tape that ensures of sufficient adhesiveness even if the double-sided adhesive tape is attached as is onto the adherend surface with oil present thereon, and that allows for excellent releasing of the release paper.

Means for Solving the Problem

A double-sided adhesive tape of the present invention includes a substrate, and a thermosetting resin layer laminated on both sides of the substrate, wherein the thermosetting resin layer contains a rubber-modified epoxy resin and a latent curing agent, and the thermosetting resin layer has a flowtester viscosity at 40° C. and under a load of 20 Kg of 1000 Pa·s or more and 7000 Pa·s or less.

In the double-sided adhesive tape of the present invention, it is preferable that the rubber-modified epoxy resin contains a liquid rubber-modified epoxy resin and a solid rubber-modified epoxy resin.

In the double-sided adhesive tape of the present invention, it is preferable that the latent curing agent contains a urea compound.

In the double-sided adhesive tape of the present invention, it is preferable that the substrate has a thickness of 25 µm or more.

Effect of the Invention

A double-sided pressure sensitive adhesive tape of the present invention can ensure sufficient adhesiveness even when attached as is onto an adherend surface with oil present, and can achieve excellent releasing of the release paper.

Thus, with the double-sided pressure sensitive adhesive tape of the present invention, improvement in adhesiveness to the adherend surface with oil present and workability can be achieved, while excellent releasing of the release paper can be realized.

EMBODIMENT OF THE INVENTION

Figure 1:
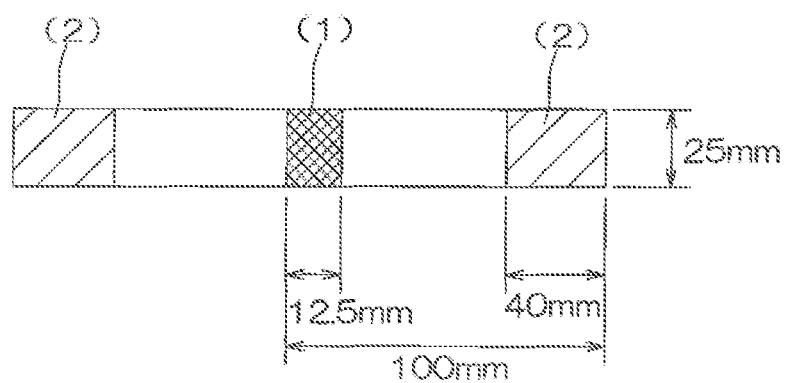
FIG. 1 shows a diagram for illustrating a testing method of shear adhesion on oiled surface in Examples and Comparative Examples.

A double-sided pressure sensitive adhesive tape of the present invention is a sheet adhesive, and includes a substrate, and a thermosetting resin layer laminated on both sides of the substrate.

Examples of the substrate include those that impart tenacity to the thermosetting resin layer, including glass fiber cloth, resin-impregnated glass fiber cloth, synthetic resin nonwoven fabric, metal foil, carbon fibers, and polyester film.

The glass fiber cloth is glass fiber made into cloth, and known glass fiber cloth may be used.

Of such glass fiber cloth, in view of tight adhesion of the substrate with the thermosetting resin layer, preferably, a silane coupling agent-treated glass fiber cloth, i.e., glass fiber cloth treated with a silane coupling agent, is used.

Examples of silane coupling agents include known silane coupling agents such as amino silane, epoxy silane, and acryloxy silane.

These silane coupling agents may be used singly or in combination.

Of those silane coupling agents, preferably, an epoxy silane is used.

The resin-impregnated glass fiber cloth is the above-described glass fiber cloth impregnated with synthetic resins such as thermosetting resins and thermoplastic resins, and examples thereof include known ones.

Examples of thermosetting resins include epoxy resin, urethane resin, melamine resin, and phenol resin.

Examples of thermoplastic resins include vinyl acetate resin, an ethylene-vinyl acetate copolymer (EVA), vinyl chloride resin, and an EVA-vinyl chloride resin copolymer.

Such thermosetting resins and thermoplastic resins may be used singly, or may be used in combination (e.g., a combination of melamine resin and vinyl acetate resin).

Examples of synthetic resin nonwoven fabric include polypropylene resin nonwoven fabric, polyethylene resin nonwoven fabric, and ester resin nonwoven fabric.

Examples of metal foil include known metal foils such as aluminum foil and steel foil.

Carbon fiber is cloth made of fiber mainly composed of carbon, and known carbon fiber may be used.

Examples of polyester films include polyethylene terephthalate (PET) film, polyethylene naphthalate (PEN) film, and polybutylene terephthalate (PBT) film.

Of these examples of the substrate, preferably, glass fiber cloth is used.

Use of glass fiber cloth as the substrate allows for provision of a highly reliably insulative and flexible adhesive sheet, and prevention of corrosion due to potential difference feared for when bonding different metals, for example, iron-aluminum.

Such a substrate has a thickness of, for example, 25 µm or more, preferably 50 µm or more, and for example, 300 µm or less, preferably 250 µm or less.

When the substrate has a thickness below 25 µm, hardness necessary for the substrate cannot be ensured, and workability for attachment of the double-sided adhesive tape may be reduced. On the other hand, when the substrate has a thickness within the above-described range, workability for attachment of the double-sided adhesive tape can be improved.

The thermosetting resin layer adheres, by curing, firmly onto the adherend surface to which the thermosetting resin layer is attached; is composed of a thermosetting resin composition that is cured by heating; and is formed into a sheet on both sides of the substrate.

The thermosetting resin composition contains at least a rubber-modified epoxy resin and a latent curing agent.

The rubber-modified epoxy resin is an epoxy resin containing a rubber component, and is prepared by reaction (modification) of epoxy resin with the rubber component.

Examples of epoxy resins include bisphenol epoxy resins such as bisphenol A epoxy resin, bisphenol F epoxy resin, bisphenol S epoxy resin, and hydrogenated bisphenol A epoxy resin; novolak epoxy resins such as phenol novolak epoxy resin, and cresol novolak epoxy resin; aromatic epoxy resins such as biphenyl epoxy resin, and naphthalene epoxy resin; nitrogen-containing-cyclic epoxy resins such as triglycidylisocyanurate, and hydantoin epoxy resin; aliphatic epoxy resin; alicyclic epoxy resins such as dicyclo ring-type epoxy resin; glycidylether epoxy resin; and urethane modified epoxy resin.

These epoxy resins may be used singly or in combination.

Of these examples of epoxy resin, in view of handleability, preferably, bisphenol A epoxy resin and bisphenol F epoxy resin, which are liquid under normal temperature, are used.

The rubber component is rubber that has a terminal group that reacts with epoxy resin, and examples thereof include a carboxyl-terminated modified butadiene-acrylonitrile copolymer (CTBN), butadiene rubber, acrylic rubber, and styrene-butadiene elastomer.

These rubber components may be used singly or in combination.

Of these examples of rubber component, preferably, the carboxyl-terminated modified butadiene-acrylonitrile copolymer (CTBN) is used.

To prepare such a rubber-modified epoxy resin, for example, epoxy resin and rubber component are mixed; a catalyst is added as necessary; and the mixture is allowed to react (be modified) at, for example, 100 to 180° C. The terminal group of the rubber component is allowed to react with epoxy resin in this manner, thereby preparing rubber-modified epoxy resin.

These rubber-modified epoxy resins may be used singly or in combination.

Such a rubber-modified epoxy resin preferably contains a liquid rubber-modified epoxy resin and a solid rubber-modified epoxy resin, in view of adjusting the flowtester viscosity, and handleability of the double-sided pressure sensitive adhesive tape.

The liquid rubber-modified epoxy resin is a rubber-modified epoxy resin that is liquid under normal temperature, and preferably, a liquid CTBN-modified epoxy resin is used.

The liquid rubber-modified epoxy resin has an epoxy equivalent of, for example, 100 to 1000 g/eq, preferably 200 to 600 g/eq.

The solid rubber-modified epoxy resin is a rubber-modified epoxy resin that is solid under normal temperature, and preferably a solid CTBN-modified epoxy resin is used.

The solid rubber-modified epoxy resin has an epoxy equivalent of, for example, 500 to 2500 g/eq, preferably 1000 to 2000 g/eq.

When the rubber-modified epoxy resin contains a liquid rubber-modified epoxy resin and a solid rubber-modified epoxy resin, the liquid rubber-modified epoxy resin and the solid rubber-modified epoxy resin are blended at a ratio of (mass ratio), for example, 95:5 to 35:65, preferably 90:10 to 40:60, and more preferably 85:15 to 45:55.

For such rubber-modified epoxy resin, for example, a commercially available product (trade name: EPR1415-1 (liquid CTBN modified epoxy resin): epoxy equivalent 400 g/eq, manufactured by ADEKA, trade name: HYypoxRK84L (solid CTBN modified epoxy resin): epoxy equivalent 1200 to 1800 g/eq, manufactured by CVC Specialty Chemicals) may also be used.

The mixing ratio of the rubber-modified epoxy resin relative to 100 parts by mass of the thermosetting resin composition is, for example, 20 to 98 parts by mass, preferably 20 to 95 parts by mass, and more preferably 30 to 75 parts by mass.

In the thermosetting resin composition, in view of adjusting the flowtester viscosity of the thermosetting resin composition, in addition to the rubber-modified epoxy resin, other epoxy resin can be used in combination.

Examples of the other epoxy resin include the above-described epoxy resins, and preferably, bisphenol epoxy resins such as bisphenol A epoxy resin that is semisolid under normal temperature, and bisphenol A epoxy resin that is solid under normal temperature are used.

The other epoxy resin has an epoxy equivalent of, for example, 90 to 1000 g/eq, preferably 100 to 500 g/eq.

The mixing ratio of the other epoxy resin relative to 100 parts by mass of the thermosetting resin composition is, for example, 10 to 70 parts by mass, preferably 20 to 60 parts by mass.

The mixing ratio of the other epoxy resin relative to 100 parts by mass of the rubber-modified epoxy resin is, for example, 20 to 170 parts by mass, preferably 30 to 150 parts by mass, and more preferably, 80 to 120 parts by mass.

When the rubber-modified epoxy resin includes a liquid rubber-modified epoxy resin and a solid rubber-modified epoxy resin, the mixing ratio of the other epoxy resin relative to 100 parts by mass of the liquid rubber-modified epoxy resin is, for example, 80 to 240 parts by mass, preferably 100 to 220 parts by mass, and the mixing ratio of the other epoxy resin relative to 100 parts by mass of the solid rubber-modified epoxy resin is, for example, 150 to 550 parts by mass, preferably 180 to 520 parts by mass.

The latent curing agent is a curing agent that is solid under normal temperature, liquefies at a predetermined temperature to cure epoxy resin, and is a compound that is active in the temperature range of 80 to 200° C.

Examples of such a latent curing agent include a urea compound, amine compound, acid anhydride compound, amide compound, dihydrazide compound, imidazole compound, and imidazoline compound.

Examples of urea compounds include 3-(3,4-dichlorophenyl)-1,1-dimethylurea (DCMU), N'-phenyl-N,N-dimethylurea, and 1,1'-(methyl-m-phenylene)bis(3,3'-dimethylurea).

Of such examples of the urea compound, preferably, 3-(3,4-dichlorophenyl)-1,1-dimethylurea (DCMU) is used.

Examples of amine compounds include ethylene diamine, propylene diamine, diethylene triamine, triethylenetetramine, amine adduct thereof, metaphenylenediamine, diaminodiphenylmethane, and diaminodiphenyl sulfone.

Examples of acid anhydride compounds include phthalic anhydride, maleic anhydride, tetrahydrophthalic anhydride, dodecenylsuccinic anhydride, dichlorosuccinic anhydride, benzophenonetetracarboxylic anhydride, and chlorendic anhydride.

Examples of amide compounds include dicyandiamide, and polyamide.

Of these examples of amide compound, preferably, dicyandiamide is used.

Examples of hydrazide compounds include dihydrazide such as adipic acid dihydrazide.

Examples of imidazole compounds include methyl imidazole, 2-ethyl-4-methyl imidazole, ethyl imidazole, isopropyl imidazole, 2,4-dimethyl imidazole, phenylimidazole, undecylimidazole, heptadecylimidazole, and 2-phenyl-4-methyl imidazole.

Examples of imidazoline compounds include methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline.

These latent curing agents may be used singly or in combination.

Of these examples of latent curing agent, preferably, a urea compound is used, and more preferably, a urea compound and an amide compound are used in combination.

The mixing ratio of the latent curing agent relative to 100 parts by mass of the rubber-modified epoxy resin is, for example, 3 to 30 parts by mass, preferably 5 to 25 parts by mass, and more preferably 10 to 20 parts by mass.

The mixing ratio of the latent curing agent relative to 100 parts by mass of the total amount of the rubber-modified epoxy resin and other epoxy resin (hereinafter referred to as total epoxy resin) is, for example, 1 to 15 parts by mass, preferably 2 to 13 parts by mass, and more preferably 5 to 10 parts by mass.

When the urea compound and the amide compound are used in combination, the mixing ratio of the urea compound relative to 100 parts by mass of the rubber-modified epoxy resin is, for example, 1 to 20 parts by mass, and preferably 1 to 10 parts by mass, and the mixing ratio of the urea compound relative to 100 parts by mass of the total epoxy resin is, for example, 1 to 10 parts by mass, preferably 1 to 5 parts by mass.

When the urea compound and the amide compound are used in combination, the mixing ratio of the amide compound relative to 100 parts by mass of the rubber-modified epoxy resin is, for example, 1 to 30 parts by mass, preferably 3 to 20 parts by mass, and the mixing ratio of the amide compound relative to 100 parts by mass of the total epoxy resin is, for example, 1 to 15 parts by mass, preferably 1 to 10 parts by mass.

Furthermore, to the thermosetting resin composition, a filler and a tenacity agent can also be added.

By adding a filler, adjustment of the flowtester viscosity of the thermosetting resin layer becomes easy. Furthermore, improvement in fracture toughness, flame retarding characteristics, and conductivity can be achieved.

Furthermore, addition of the tenacity agent improves flexibility of the thermosetting resin layer after curing, and allows addition of tenacity to the thermosetting resin layer after curing.

Examples of fillers include a hard filler and a soft filler.

Examples of hard filler include calcium carbonate (e.g., calcium carbonate heavy, calcium carbonate light, Hakuenka, etc.), talc, mica, clay, mica powder, bentonite, silica (e.g., hydrophobic silica), alumina, aluminum silicate, aluminum hydroxide, titanium oxide, barium titanate, ferrite, carbon black, acetylene black, aluminum powder, glass powder, and glass balloon.

The hard filler mainly impart thixotropy to the thermosetting resin composition, and furthermore, can be used as a viscosity modifier.

These hard fillers may be used singly or in combination.

Of these examples of the hard filler, preferably, hydrophobic silica or glass powder is used, and more preferably, these are used in combination.

When the hydrophobic silica and glass powder are used in combination, the mixing ratio of the hydrophobic silica relative to 100 parts by mass of the glass powder is, for example, 1 to 20 parts by mass, preferably 5 to 15 parts by mass.

Examples of the soft filler include thermoplastic resins such as rubber, elastomer, and nylon (registered trademark).

These soft fillers may be used singly or in combination.

Of these soft fillers, preferably, rubber is used, and more preferably, core shell acrylic polymer rubber particles are used. Core shell acrylic polymer rubber particles are core/shell structure particles composed of a core portion that is substantially composed of rubber, and a shell portion composed of an acrylic polymer and encapsulates the core portion.

When such core shell acrylic polymer rubber particles are added to the thermosetting resin composition, the shell portion is compatible with the rubber-modified epoxy resin, and the core portion has stress relaxation characteristics, and therefore the tenacity can be imparted to the rubber-modified epoxy resin after curing.

These fillers may be used singly or in combination.

To be specific, of such examples of filler, one of the hard filler and the soft filler can be used singly, and preferably, the hard filler and the soft filler are used in combination.

When the hard filler and the soft filler are used in combination, the mixing ratio of the hard filler relative to 100 parts by mass of the soft filler is, for example, 1 to 500 parts by mass, preferably 2 to 100 parts by mass, and more preferably 5 to 20 parts by mass.

The mixing ratio of the filler relative to 100 parts by mass of the thermosetting resin composition is, for example, 5 to 500 parts by mass, and preferably 10 to 300 parts by mass, and the mixing ratio of the filler relative to 100 parts by mass of the total epoxy resin is, for example, 5 to 500 parts by mass, preferably 10 to 300 parts by mass, and more preferably 15 to 100 parts by mass.

When the hard filler and the soft filler are used in combination, the mixing ratio of the hard filler relative to 100 parts by mass of the thermosetting resin composition is, for example, 0.1 to 30 parts by mass, preferably 0.5 to 20 parts by mass, and more preferably 1 to 10 parts by mass, and the mixing ratio of the hard filler relative to 100 parts by mass of the total epoxy resin is, for example, 0.1 to 40 parts by mass, preferably 0.5 to 30 parts by mass, and more preferably 1 to 15 parts by mass. When the hard filler and the soft filler are used in combination, the mixing ratio of the soft filler relative to 100 parts by mass of the thermosetting resin composition is, for example, 1 to 50 parts by mass, preferably 10 to 40 parts by mass, and more preferably 15 to 30 parts by mass, and the mixing ratio of the soft filler relative to 100 parts by mass of the total epoxy resin is, for example, 1 to 50 parts by mass, preferably 10 to 40 parts by mass, and more preferably 15 to 30 parts by mass.

When the hydrophobic silica and glass powder are used in combination, the mixing ratio of the hydrophobic silica relative to 100 parts by mass of the thermosetting resin composition is, for example, 0.1 to 10 parts by mass, preferably 0.5 to 5 parts by mass, and the mixing ratio of the hydrophobic silica relative to 100 parts by mass of the total epoxy resin is, for example, 0.1 to 15 parts by mass, preferably 0.5 to 8 parts by mass. When the hydrophobic silica and glass powder are used in combination, the mixing ratio of the glass powder relative to 100 parts by mass of the thermosetting resin composition is, for example, 5 to 30 parts by mass, and preferably 10 to 20 parts by mass, and the mixing ratio of the glass powder relative to 100 parts by mass of the total epoxy resin is, for example, 10 to 40 parts by mass, preferably 15 to 30 parts by mass.

Examples of tenacity agent include urethane polymer (urethane resin).

Of these examples of urethane polymers, preferably, urethane acrylate resin is used, and more preferably, a urethane resin having an acryloyl group at its terminal end is used.

The mixing ratio of the tenacity agent relative to 100 parts by mass of the thermosetting resin composition is, for example, 0.5 to 80 parts by mass, and preferably 1 to 30 parts by mass, and the mixing ratio of the tenacity agent relative to 100 parts by mass of the total epoxy resin is, for example, 1 to 100 parts by mass, preferably 5 to 50 parts by mass.

When the mixing ratio of the tenacity agent relative to 100 parts by mass of the total epoxy resin is below 1 part by mass, effects of the addition of the tenacity agent (improvement in flexibility of the thermosetting resin layer after curing and imparting of tenacity) may not be brought out, and when the mixing ratio of the tenacity agent relative to 100 parts by mass of the total epoxy resin is more than 100 parts by mass, reduction in modulus of elasticity of the thermosetting resin layer becomes significant, and adhesive strength of the double-sided pressure sensitive adhesive tape may be reduced.

To the thermosetting resin composition, in addition to the above-described component, as necessary, for example, known additives such as a tackifier (e.g., rosin resin, terpene resin, coumarone-indene resin, petroleum resin, etc.), lubricant (e.g., stearic acid, etc.), stabilizer, oxidation inhibitor, antioxidant, ultraviolet absorber, coloring agent, fire retardant, antistatic agent, conductive agent, sliding agent, and surfactant can be added at a suitable proportion.

In the thermosetting resin composition, the above-described components are blended at the above-described mixing ratio, and without limitation, for example, kneaded with, for example, a mixing roll to be prepared as a kneaded material. When kneading, as necessary, heating can also be performed below the temperature at which the latent curing agent substantially reacts.

The kneaded material (thermosetting resin composition) thus obtained has a flowtester viscosity of 1000 Pa·s or more and 7000 Pa·s or less, preferably 1100 Pa·s or more and 6800 Pa·s or less, and more preferably 1500 Pa·s or more and 5000 Pa·s or less at 40° C. and under a load of 20 Kg.

When the thermosetting resin composition has a flowtester viscosity of below 1000 Pa·s, cohesive force of the thermosetting resin composition decreases, and peeling from the release paper becomes difficult, and may reduce workability for attachment of the double-sided pressure sensitive adhesive tape. When the thermosetting resin composition has a flowtester viscosity of more than 7000 Pa·s, flowability of the thermosetting resin composition at the time of heating is reduced, and adhesive strength on oiled surface of the double-sided pressure sensitive adhesive tape may be reduced. Meanwhile, when the flowtester viscosity of the thermosetting resin composition is within the above-described range, improvement in workability for attachment and adhesiveness of the double-sided adhesive tape on oiled surface can be achieved.

The flowtester viscosity is a viscosity measured with a constant-load orifice-type flow tester viscometer, to be specific, is a viscosity measured in conformity with JIS K7210 (determination of the melt mass-flow rate of thermoplastics) by heating at a measurement temperature of 40° C. for 180 seconds, and thereafter measured under conditions of a load of 20 kg with a flowtester viscometer (e.g., CFT-500 (manufactured by Shimadzu Corporation)) using a die having a diameter of 1 mm and a length of 1 mm.

Then, the obtained kneaded materials are sandwiched between two sheets of release paper, and by allowing the kneaded materials to extend under pressure, for example, with press molding, a thermosetting resin layer can be formed between the two sheets of release paper.

The thermosetting resin layer has a thickness of, for example, 0.05 to 2 mm, preferably 0.1 to 1 mm.

Then, the release paper on the one side of the two thermosetting resin layers prepared as described above is peeled, and then the thermosetting resin layers are attached onto both sides of a substrate, thereby producing a double-sided pressure sensitive adhesive tape.

The double-sided pressure sensitive adhesive tape has a thickness of, for example, 0.1 to 4 mm, preferably 0.3 to 2 mm.

A double-sided pressure sensitive adhesive tape can also be obtained, for example, by forming a thermosetting resin layer on both sides of the substrate from the obtained kneaded material under a condition of a temperature that does not allow substantially reaction of the latent curing agent by, for example, subjecting the kneaded material to a knife coating, roll coating, or extrusion coating; and then by bonding the release paper on the surfaces of the thermosetting resin layers formed on both sides of the substrate.

A double-sided pressure sensitive adhesive tape can also be produced by laminating the thermosetting resin layer by, for example, coating the thermosetting resin composition on the surface of the release paper, and then laminating the thermosetting resin layer on both sides of the substrate.

With such a double-sided adhesive tape, after peeling one side of the release paper and then attaching the double-sided adhesive tape on the surface of the adherend, the release paper on the other side of the attached side is peeled, and for example, a structural member of various industrial products is bonded to the double-sided adhesive tape. Examples of the adherend include metal adherend such as metal panel, and resin adherend such as resin panel. However, in production procedures of various industrial products such as automobiles, generally, oil is present on the surface of the adherend such as a metal panel.

With such a double-sided pressure sensitive adhesive tape, even if the double-sided pressure sensitive adhesive tape is attached as is onto the surface of the adherend on which oil is present, sufficient adhesiveness can be ensured, and also after attachment, the release paper can be peeled excellently.

Thus, with the double-sided pressure sensitive adhesive tape of the present invention, improvement in adhesiveness to the surface of the adherend on which oil is present and workability can be achieved, and excellent peeling of the release paper can be achieved.

EXAMPLES

While the present invention is described in further detail with reference to Examples and Comparative Examples, the present invention is not limited to these.

Examples and Comparative Examples

The components were blended according to the mixing formulation shown in Table 1, and the mixture was kneaded with a mixing roll, thereby preparing a kneaded material (thermosetting resin composition). In the kneading, first, epoxy resin, rubber-modified epoxy resin, filler, and tenacity agent were kneaded with a mixing roll heated to 120° C. Thereafter, the kneaded material was cooled to 60 to 100° C., and further a latent curing agent was added thereto. The mixture was kneaded with a mixing roll, thereby producing a kneaded material.

Then, the obtained kneaded material was allowed to extend under pressure by press molding with the kneaded material being sandwiched with release papers into a thickness of 0.2 mm, thereby forming a thermosetting resin layer.

Thereafter, the release paper on one side of the thermosetting resin layer was peeled, and then onto both sides of the glass fiber cloth substrate (epoxy silane-treated, mass 209 g/m²) having a thickness of 200 μm, the thermosetting resin layer was attached by heat pressing (50° C.) so that the thickness of the thermosetting resin layer and the substrate in total was 0.5 mm, thereby producing a double-sided adhesive tape.

Evaluation

The double-sided adhesive tapes obtained in Examples and Comparative Examples were subjected to measurements of shear adhesion on oiled surface and T-peel force on oiled surface, releaseability test of release paper on oiled surface, and flowtester viscosity measurement as follows. The results are shown in Table 1.

(1) Measurement of Shear Adhesion on Oiled Surface

Two cold-rolled steel plates (SPCC-SD, manufactured by Nippon Testpanel Co., Ltd.) to which Daphne oil coat RL55 (manufactured by Idemitsu Kosan, Co., Ltd.) was applied and having a width of 25 mm, a length of 100 mm, and a thickness of 0.8 mm were prepared.

Then, as shown in FIG. 1, the double-sided adhesive tape (1) of Examples and Comparative Examples were cut into a width of 25 mm and a length of 12.5 mm, and the releasing paper at one side of the double-sided adhesive tape that was cut out was peeled off.

Then, one side of the double-sided tape from which the release paper was peeled was bonded to one of the prepared cold-rolled steel plates under an atmosphere of 20° C. Then, the release paper of the other side of the attached double-sided adhesive tape was peeled off, and after attaching the other cold-rolled steel plate onto the double-sided adhesive tape so that the double-sided tape was sandwiched between the cold-rolled steel plates, the two cold-rolled steel plates to which the double-sided adhesive tape was attached were fixed with a paper clip. Then, by heating at 150° C. for 20 min, the thermosetting resin layer was cured, thereby producing test pieces.

Thereafter, a portion of 40 mm (chuck region (2)) from the end portion of the both sides of the test piece was chucked, and a tensile test was performed at a testing speed of 50 mm/min, thereby measuring a shear adhesion on oiled surface.

(2) Measurement of T-Peel Force on Oiled Surface

Two cold-rolled steel plates (SPCC-SD, manufactured by Nippon Testpanel Co., Ltd.) were prepared. To the cold-rolled steel plates, Daphne oil coat RL-55 (manufactured by Idemitsu Kosan) was applied. Each of the cold-rolled steel plates had a width of 25 mm, a length of 150 mm, and a thickness of 0.8 mm; and was folded to a right angle.

Figure 2:
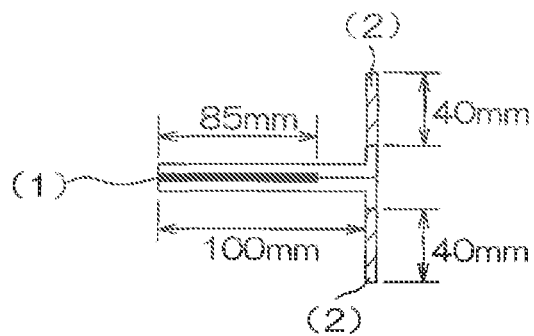
FIG. 2 shows a diagram for illustrating a testing method of T-peel force test in Examples and Comparative Examples.

Then, as shown in FIG. 2, the double-sided adhesive tapes (1) of Examples and Comparative Examples were cut into a width of 25 mm and a length of 85 mm, and the releasing paper of one side of the double-sided adhesive tape that was cut out was peeled off.

Then, the one side of the double-sided tape from which the release paper was peeled was attached in an atmosphere of 20° C. onto one of the cold-rolled steel plate prepared. Then, the release paper of the other side of the attached double-sided tape was peeled off, and after the other cold-rolled steel plate was attached so that the double-sided tape was sandwiched between the cold-rolled steel plates, the two cold-rolled steel plates to which the double-sided adhesive tape was attached were fixed with a paper clip. Then, by heating at 150° C. for 20 minutes, the thermosetting resin layer was cured, thereby producing test pieces.

Thereafter, a portion of 40 mm (chuck region (2)) from the end portion of the both sides of the test piece was chucked, and a tensile test was performed at a testing speed of 200 mm/min, thereby measuring an average T-peel force during peeling.

(3) Releasability Test of Release Paper on Oiled Surface

The double-sided adhesive tapes of Examples and Comparative Examples were cut into a width of 25 mm and a length of 150 mm, and the releasing paper of one side of the double-sided adhesive tape that was cut out was peeled off.

Then, the double-sided adhesive tapes were pressure-bonded to cold-rolled steel plate (SPCC-SD, manufactured by Nippon Testpanel Co., Ltd.) to which Daphne oil coat RL-55 (manufactured by Idemitsu Kosan Co., Ltd.) was applied and having a width of 40 mm, a length of 100 mm, and a thickness of 0.8 mm with a 2 Kg roller. Then, after 5 seconds from the pressure bonding, the release paper of the other side of the double-sided adhesive tape was checked if it could be peeled off, and evaluated based on the criteria below.
Good: rising or peeling of the double-sided adhesive tape end portion from the cold-rolled steel plate did not occur, and the release paper of the other side can be peeled.
Bad: the double-sided adhesive tape rose along with the release paper of the other side from the cold-rolled steel plate, and the release paper of the other side cannot be peeled.

(4) Flowtester Viscosity Measurement

The flowtester viscosity of the kneaded materials (thermosetting resin composition) of Examples and Comparative Examples was measured in conformity with JIS K7210 (determination of the melt mass-flow rate of thermoplastics), with CFT-500 manufactured by Shimadzu Corporation.

To be specific, 2 g of kneaded material (thermosetting resin composition) was put into a cylinder set to 40° C. of CFT-500, and heated for 180 seconds. Thereafter, under a load of 20 Kg, the flowtester viscosity was measured. A die having a diameter of 1 mm and a length of 1 mm was used.

TABLE 1

|  |  |  | Examples ||||||||| 
| --- | --- | --- | --- | --- | --- | --- | --- | --- | --- | --- | --- |
|  |  |  | Ex. 1 | Ex. 2 | Ex. 3 | Ex. 4 | Ex. 5 | Ex. 6 | Ex. 7 | Ex. 8 | Ex. 9 |
| Thermosetting resin composition | Epoxy Resin | Semi-solid Epoxy Resin | 50 | 50 | 50 | 50 | — | — | 50 | 50 | 50 |
|  |  | Solid Epoxy Resin | — | — | — | — | — | 25 | — | — | — |
|  | Rubber-modified Epoxy Resin | Liquid Rubber-modified Epoxy Resin | 40 | 35 | 25 | 35 | 90 | 75 | 35 | 35 | 35 |
|  |  | Solid Rubber-modified Epoxy Resin | 10 | 15 | 25 | 15 | 10 | — | 15 | 15 | 15 |
|  | Latent Curing Agent | Urea Compound | 2 | 2 | 2 | 2 | 2 | 2 | 2 | 2 | 2 |
|  |  | Dicyandiamide | 5 | 5 | 5 | 5 | 5 | 5 | 5 | 5 | 5 |
|  | Hard Filler | Hydrophobic Silica | — | — | — | 2 | — | — | 2 | 2 | 2 |
|  |  | Glass Powder | — | — | — | 20 | — | — | — | 20 | 20 |
|  | Soft Filler | Core Shell Acrylic Polymer Rubber Particles | — | — | — | — | — | — | 20 | — | — |
|  | Tenacity Agent | Urethane Polymer | — | — | — | — | — | — | — | 5 | 10 |
| Evaluation | Total |  | 107 | 107 | 107 | 129 | 107 | 107 | 129 | 134 | 139 |
|  | Shear Adhesion on Oiled Surface [MPa] |  | 19.8 | 20.1 | 21.0 | 19.2 | 21.4 | 20.6 | 22.3 | 21.8 | 22.0 |
|  | T-peel Force on Oiled Surface [N/25 mm] |  | 152 | 156 | 149 | 146 | 163 | 118 | 188 | 177 | 178 |
|  | Releasability of Release Paper on Oiled Surface |  | Good | Good | Good | Good | Good | Good | Good | Good | Good |
|  | Flowtester Viscosity [40° C., 20 Kg] |  | 1129 | 2116 | 6543 | 2593 | 3327 | 6800 | 6198 | 2753 | 1862 |

|  |  |  | Comparative Examples |||||
| --- | --- | --- | --- | --- | --- | --- | --- |
|  |  |  | Comp. Ex. 1 | Comp. Ex. 2 | Comp. Ex. 3 | Comp. Ex. 4 | Comp. Ex. 5 |
| Thermosetting resin composition | Epoxy Resin | Semi-solid Epoxy Resin | 50 | 50 | 50 | 50 | — |
|  |  | Solid Epoxy Resin | — | — | — | — | 50 |
|  | Rubber-modified Epoxy Resin | Liquid Rubber-modified Epoxy Resin | 50 | — | 15 | 10 | 50 |
|  |  | Solid Rubber-modified Epoxy Resin | — | 50 | 35 | 40 | — |
|  | Latent Curing Agent | Urea Compound | 2 | 2 | 2 | 2 | 2 |
|  |  | Dicyandiamide | 5 | 5 | 5 | 5 | 5 |
|  | Hard Filler | Hydrophobic Silica | — | — | — | — | — |
|  |  | Glass Powder | — | — | — | — | — |
|  | Soft Filler | Core Shell Acrylic Polymer Rubber Particles | — | — | — | — | — |
|  | Tenacity Agent | Urethane Polymer | — | — | — | — | — |
| Evaluation | Total |  | 107 | 107 | 107 | 107 | 107 |
|  | Shear Adhesion on Oiled Surface [MPa] |  | 16.9 | 12.3 | 14.2 | 13.9 | 15.3 |
|  | T-peel Force on Oiled Surface [N/25 mm] |  | 132 | 32 | 83 | 83 | 79 |
|  | Releasability of Release Paper on Oiled Surface |  | Bad | Bad | Good | Bad | Bad |
|  | Flowtester Viscosity [40° C., 20 Kg] |  | 369 | 118800 | 18150 | 31140 | 33900 |

The abbreviations in Table 1 are shown below.
Semi-solid epoxy resin: normal temperature semi-solid bisphenol A epoxy resin (trade name: Epikote (registered trademark)#834, epoxy equivalent 270 g/eq., manufactured by Mitsubishi Chemical Corporation)
Solid epoxy resin: normal temperature solid bisphenol A epoxy resin (trade name: Epikote (registered trademark)#1001, epoxy equivalent 450 to 500 g/eq., manufactured by Mitsubishi Chemical Corporation)
Liquid rubber-modified epoxy resin: liquid CTBN-modified epoxy resin (trade name: EPR1415-1, epoxy equivalent 400 g/eq., manufactured by ADEKA corporation)
Solid rubber-modified epoxy resin: solid CTBN-modified epoxy resin (trade name: HypoxRK84L, epoxy equivalent 1200 to 1800 g/eq., manufactured by CVC Specialty Chemicals)
Urea compound: 3-(3,4-dichlorophenyl)-1,1-dimethylurea (trade name: DCMU, manufactured by Hodogaya Chemical Co., LTD.)
Dicyandiamide (trade name: DDA-50, manufactured by CVC Specialty Chemicals)
Hydrophobic silica: dimethyl silicone oil surface treated silica (trade name: AEROJIL RY200, average particle size 12 μm, manufactured by Nippon Aerosil Co., Ltd.)
Glass powder: glass powder (trade name: PF70E-001, specific gravity 2.58, average fiber length 10.5 μm, manufactured by Nitto Boseki Co., Ltd.)
Core shell acrylic polymer rubber particles: core shell acrylate copolymer microparticles (trade name: ZEFIAC F351, primary particle size 0.3 μm, absolute specific gravity 1.13, manufactured by Ganz Chemical Co., Ltd.)
Urethane polymer: urethane acrylate (trade name: Ancarez 2364, specific gravity 1.1, viscosity 30000 mPa·s, manufactured by Air Products Japan Inc.)

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The double-sided adhesive tape of the present invention is used for bonding of structural members of various industrial products.

The invention claimed is:

1. A double-sided adhesive tape comprising:
a substrate having two sides, and
a thermosetting resin layer laminated on both sides of the substrate,
wherein each thermosetting resin layer contains a rubber-modified epoxy resin and a latent curing agent,
wherein each thermosetting resin layer has a flowtester viscosity at 40° C. and under a load of 20 Kg of 1000 Pa·s or more and 7000 Pa·s or less,
wherein the rubber-modified epoxy resin contains a liquid rubber-modified epoxy resin and a solid rubber-modified epoxy resin,
wherein the liquid rubber-modified epoxy resin and the solid rubber-modified epoxy resin are blended at a ratio of 85:15 to 45:55,
wherein the liquid rubber-modified epoxy resin is a liquid carboxyl-terminated modified butadiene-acrylonitrile copolymer modified epoxy resin, and
wherein the solid rubber-modified epoxy resin is a solid carboxyl-terminated modified butadiene-acrylonitrile copolymer modified epoxy resin.

2. The double-sided adhesive tape according to claim 1, wherein the latent curing agent contains a urea compound.

3. The double-sided adhesive tape according to claim 1, wherein the substrate has a thickness of 25 µm or more.

4. The double-sided adhesive tape according to claim 1, wherein as the latent curing agent, a urea compound and an amide compound are used together.

5. The double-sided adhesive tape according to claim 1, wherein at least one thermosetting resin layer further contains a bisphenol A epoxy resin that is semisolid under normal temperature.

* * * * *